US00RE46344E

(19) United States
(12) Reissued Patent
Chaize

(10) Patent Number: US RE46,344 E
(45) Date of Reissued Patent: Mar. 21, 2017

(54) WET-MATEABLE CONNECTOR

(71) Applicant: RMSpumptools Limited, Aberdeen (GB)

(72) Inventor: Eric Chaize, Malton (GB)

(73) Assignee: RMSPUMPTOOLS LIMITED (GB)

(21) Appl. No.: 14/842,491

(22) Filed: Sep. 1, 2015

Related U.S. Patent Documents

Reissue of:
(64) Patent No.: 8,668,509
Issued: Mar. 11, 2014
Appl. No.: 13/104,359
Filed: May 10, 2011

(30) Foreign Application Priority Data

May 11, 2010 (GB) ..... 1007841
Jan. 19, 2011 (GB) ..... 1100909

(51) Int. Cl.
*H01R 13/52* (2006.01)
*E21B 33/038* (2006.01)
*H01R 13/627* (2006.01)
*H01R 13/523* (2006.01)

(52) U.S. Cl.
CPC ..... *E21B 33/0385* (2013.01); *H01R 13/523* (2013.01); *H01R 13/6277* (2013.01)

(58) Field of Classification Search
CPC ..... H01R 13/523; E21B 17/06; E21B 17/028; E21B 47/123
USPC ..... 137/68.15; 166/106, 278; 174/21 R; 385/56; 439/190, 191, 201, 204
See application file for complete search history.

(56) References Cited

U.S. PATENT DOCUMENTS 1,871,397 A * 8/1932 Watts ..... 439/281
3,398,392 A 8/1968 Henderson
4,050,765 A * 9/1977 Duesterhoeft ..... H01R 13/523 439/204
4,174,875 A 11/1979 Wilson et al. ..... H01R 13/523 439/190
4,192,569 A * 3/1980 Mucci ..... H01R 13/523 174/21 R
4,767,349 A 8/1988 Pottier et al.
(Continued)

FOREIGN PATENT DOCUMENTS

CA 2759436 A1 10/2010
GB 2366673 A 3/2002
(Continued)

OTHER PUBLICATIONS

UK Search Report for GB1100909.9; May 6, 2011; 1 pg.

*Primary Examiner* — Christopher E. Lee
(74) *Attorney, Agent, or Firm* — Gardner Groff Greenwald & Villanueva, PC

(57) ABSTRACT

A wet-mateable connector for making a connection underwater comprises a male component 10 having a male pin 14 and a female component 20 having a female socket 24 for receiving the male pin. The male component has a male wiper seal assembly 16 which moves between a decoupled and a coupled position during coupling of the male component 10 and female component 20 so as to wipe at least a portion of the male pin 14. A latch 42a, 48 is provided which is arranged to latch the male wiper seal assembly 16 to the female component 20 during coupling such that when the male and female components are decoupled, the male wiper seal assembly 16 is returned to the decoupled position.

18 Claims, 15 Drawing Sheets

(56) References Cited

U.S. PATENT DOCUMENTS

| | | | | |
|---|---|---|---|---|
| 4,825,946 | A | 5/1989 | Schnatzmeyer | |
| 4,997,384 | A | 3/1991 | Godfrey et al. | |
| 5,334,032 | A * | 8/1994 | Myers et al. | 439/140 |
| 6,142,237 | A * | 11/2000 | Christmas | E21B 17/028 166/106 |
| 6,213,202 | B1 * | 4/2001 | Read, Jr. | E21B 17/06 137/68.15 |
| 6,511,335 | B1 * | 1/2003 | Rayssiguier | H01R 13/523 385/56 |
| 6,832,924 | B2 * | 12/2004 | Maletzki | H01R 13/523 439/201 |
| 6,910,910 | B2 * | 6/2005 | Cairns | 439/352 |
| 7,112,080 | B2 * | 9/2006 | Nicholson | 439/283 |
| 7,222,676 | B2 * | 5/2007 | Patel | E21B 47/123 166/278 |
| 7,695,301 | B2 * | 4/2010 | Mudge et al. | 439/271 |
| 8,272,885 | B2 * | 9/2012 | Pearce et al. | 439/345 |
| 8,376,765 | B2 * | 2/2013 | Chaize | 439/201 |
| 8,485,837 | B2 | 7/2013 | Head | |
| 2009/0197447 | A1 * | 8/2009 | Maeland | H01R 13/523 439/191 |
| 2011/0306225 | A1 * | 12/2011 | Chaize | 439/201 |

FOREIGN PATENT DOCUMENTS

| | | | | |
|---|---|---|---|---|
| GB | 2481558 | A | 12/2011 | |
| NO | 20111606 | A1 | 11/2011 | |
| WO | 2010122342 | A1 | 10/2010 | |
| WO | WO 2010/122342 | A1 * | 10/2010 | H01R 13/523 |

* cited by examiner

WET-MATEABLE CONNECTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. application Ser. No. 13/104,359 filed May 10, 2011, now U.S. Pat. No. 8,668,509, which* claims priority to British Patent Application No. 1007841.8 filed on 11 May 2010, and to British Patent Application No. 1100909.9 filed on 19 Jan. 2011, which are incorporated herein by reference in their entireties.

BACKGROUND OF THE INVENTION

The invention relates to a connector for making a connection underwater, sometimes known as a "wet-mate" or "wet-mateable" connector.

So called wet-mate connectors are used in underwater applications where it is necessary to make a connection, such as an electrical or optical connection, in an environment which is hostile to contact, for example in sea water, and which therefore requires special protection for the components that complete the connection.

One example of an application in which an electrical connection must be made in a harsh underwater environment is that of a well-head in a sub-sea oil well.

After assembly of the well-head on the sea bed it is necessary to connect control cables to sensors and other electrical equipment associated with the well-head. The engagement of a control cable with a corresponding connector on the well-head may be carried out by a diver. The two connectable parts typically comprise a receptacle part and a plug part; the latter which becomes inserted within the former. Each part comprises a substantially cylindrical body part having within it the electrical contact. The electrical contact is typically provided with a protective apparatus to shield it from the surrounding sea water, in order to preserve the integrity of the connector and therefore the electrical connection when subsequently made.

The receptacle part houses a male connecting pin, and the plug part houses the complementary female contact socket. Each of the receptacle and plug is attached by a suitable termination means to respective electrical cables. In use, the receptacle part receives the plug part and as it does so the male pin contact penetrates and makes electrical connection with the female contact socket. Various designs of such connector exist in which there may be a single male pin engaging with a single contact module, or else a plurality of male pins and respective contact modules.

In all cases measures must be taken to prevent the electrical contacts from being exposed to sea water and other harmful matter, such as oil and drilling fluid for example. Maintaining a good seal around the electrical contacts may be necessary for long periods. In order to provide protection for the electrical contacts a number of mechanisms are employed. These include one or more wiper seals arranged to wipe contaminants from the contacts as first a mechanical, and then an electrical, connection is made between the connecting parts. Another common measure is the use of a so called shuttle pin which occupies in an unconnected configuration a position within the female contact module which will subsequently be occupied by the male contact pin when electrical connection is made. In one typical arrangement the plug is generally cylindrical with an outer housing surrounding a generally cylindrical contact module in which is mounted an axially slidable resiliently biased shuttle pin. The receptacle part is also generally cylindrical and houses a cylindrical male connector pin. When the plug is inserted into the receptacle the male contact pin of the latter axially engages the shuttle pin, and as mechanical engagement is continued the male pin axially displaces the shuttle pin through the contact module until electrical connection is made between the male pin and the female contact module. Typically a wiper seal on the plug wipes the male pin as it penetrates the plug.

Since well-heads are frequently located at great depth, the connector parts need to be pressure balanced. This is usually achieved by filling chambers in the connector parts with a pressurised dielectric oil, and providing one or more expandable bladders or diaphragms to accommodate movement of the oil as mechanical and electrical engagement is made and unmade.

As well-head connections become more complex with increasing requirements for monitoring and control equipment, the space available for connectors of the kind described above becomes reduced, and thus the need for more compact connectors increases.

SUMMARY OF THE INVENTION

Embodiments of the invention aim to provide a wet-mateable electrical connector for underwater applications which is compact and reliable and which provides improved protection for the electrical contacts therein.

The invention is defined in the attached independent claim to which reference should now be made. Further optional features may be found in the sub claims appended thereto.

In a broad aspect the invention relates to a wet-mateable connector for making a connection underwater comprising: a male component having a male pin and a female component having a female socket for receiving the male pin; wherein the male and female components are arranged to be mechanically coupled together such that the female socket receives the male pin, thereby making the connection. The male component may comprise a male wiper seal assembly which moves between a decoupled and a coupled position during coupling of the male component and female component so as to wipe at least a portion of the male pin. The connector may further a comprise a latch arranged to latch the male wiper seal assembly to the female component during coupling such that when the male and female components are decoupled, the male wiper seal assembly is returned to the decoupled position. The connector may comprise a fluid chamber containing a dielectric fluid disposed in the male or female component and may further comprise a water ingress treatment module for removing water from the dielectric fluid.

According to an aspect of the invention there is provided a wet-mateable connector for making a connection underwater comprising: a male component having a male pin and a female component having a female socket for receiving the male pin; wherein the male component has a male wiper seal assembly which moves between a decoupled and a coupled position during coupling of the male component and female component so as to wipe at least a portion of the male pin; and a latch arranged to latch the male wiper seal assembly to the female component during coupling such that when the male and female components are decoupled, the male wiper seal assembly is returned to the decoupled position. The latch may be arranged to latch the male wiper seal assembly to a nose, or front, portion of the female component.

The latch may comprise corresponding latch parts provided on the male wiper seal assembly and the female component that are arranged to engage with one another so as to latch the male wiper seal assembly to the female component. At least one of the corresponding latch parts may be resiliently deformable. One of the latch parts may be a cantilevered plate. The latch may comprise a male latch projection and a female latch recess that are arranged to be engaged with one another.

The male wiper seal assembly may be axially moveable.

The female component may comprise a female wiper seal disposed such that when the male wiper seal assembly is latched to the female component, the male and female wiper seals abut.

The male component may further comprise a retainer that when engaged retains the male wiper seal assembly in the decoupled position, thereby restricting the movement of the male wiper seal assembly. The retainer may be arranged to be automatically disengaged during coupling of the male and female components, such that the male wiper seal assembly can move to the coupled position. The retainer may be arranged to be disengaged by applying a coupling force to the male wiper seal assembly from the female component in a direction towards the coupled position. The coupling force required to disengage the retainer may be greater than the force required to engage the latch such that during coupling of the male and female components the latch engages before the retainer disengages. The retainer may prevent the male wiper seal assembly from being withdrawn from the male component.

The retainer may comprise a retaining member and a corresponding retaining recess, at least one of which is resiliently deformable. The retaining member may be substantially annular and may be disposed in a substantially annular recess provided in the male wiper seal assembly or in the male component, and wherein the retaining recess may be formed in the other of the male wiper seal assembly and the male component.

The connector may further comprise a fluid chamber containing dielectric fluid and a water ingress treatment module for removing water from the dielectric fluid; wherein the male and female components are arranged to be mechanically coupled together such that the female socket receives the male pin, thereby making the connection. The fluid chamber may be disposed or located in the male or female component. The water ingress treatment module may be disposed within the fluid chamber.

The connector may be arranged such that coupling of the male and female components causes the dielectric fluid to flow through the water ingress treatment module. The flow of dielectric fluid may be caused by a change of volume within the fluid chamber.

One of the components may comprise a shuttle pin at least partially disposed within the fluid chamber that moves within the fluid chamber as the male and female components are coupled, thereby causing the dielectric fluid to flow through the water ingress treatment module. The female component may comprise the shuttle pin which may be part of a contact module which may also comprise the contact socket. Upon coupling, the male pin may act on the shuttle pin so as to move it within the fluid chamber. At least part of the contact module may be disposed in the fluid chamber. A portion of the shuttle pin may extend outside of the fluid chamber.

The shuttle pin may be axially moveable. The shuttle pin may be moveable within an outer sleeve, which may form part of a contact module, the interior of which is in fluid communication with the fluid chamber.

The fluid chamber may be sealed. The water ingress treatment module may comprise a molecular sieve.

The connector may be an electrical connector and/or an optical connector.

According to another aspect of the invention there is provided a wet-mateable connector for making an electrical connection underwater, comprising a male component having a male electrical contact pin and a female component having a female electrical contact socket for receiving the male electrical contact pin, characterised in that the connector comprises a sealed portion containing dielectric fluid and a water ingress treatment module for removing water from the dielectric fluid. The water ingress treatment module may comprise a molecular sieve.

According to another aspect of the invention there is provided a wet-mateable connector for making an electrical connection underwater, comprising a male component having a male electrical contact pin and a female component having a female electrical contact socket for receiving the male electrical contact pin, characterised in that the male component has a wiper assembly arranged to wipe the male contact pin during engagement between the male component and female component, and wherein the wiper assembly comprises a latch means arranged in use to latch onto a corresponding part of the female component during engagement of the male and female components.

According to another aspect of the invention there is provided a wet-mateable connector for making an electrical connection underwater, comprising a male component having a male electrical contact pin and a female component having a female electrical contact socket for receiving the male electrical contact pin, characterised in that the female component has primary and secondary wiper seals arranged to wipe the male component during engagement and disengagement.

BRIEF DESCRIPTION OF THE DRAWINGS

An embodiment of the invention will now be described by way of example only with reference to the accompanying diagrammatic drawings in which.

DESCRIPTION OF AN EMBODIMENT OF THE INVENTION

Figure 1:
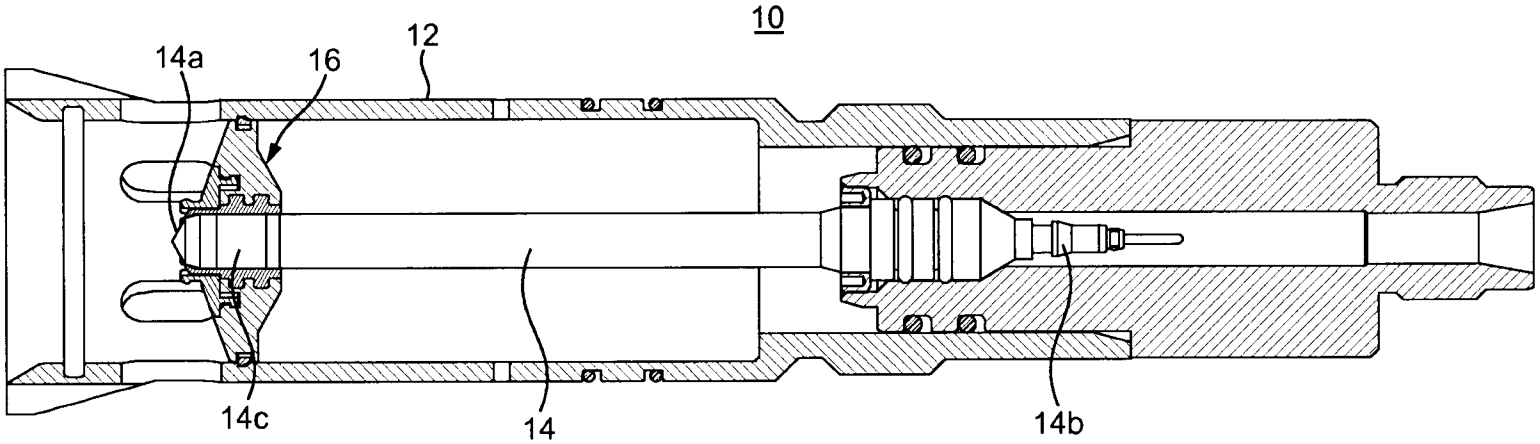
FIG. 1 is a part sectional view of a male component of a connector assembly according to an embodiment of the invention.

FIG. 1 shows generally at 10 a male component of a connector assembly according to an embodiment of the invention. The male component 10 comprises a substantially cylindrical hollow shroud housing 12, inside which is located a male contact pin 14 which has a first distal end 14a, an annular contact band 14c for making a disengageable electrical contact with a female component (not shown in FIG. 1, and to be described later) and a second end 14b comprising an electrical terminal for permanent connection to an electrical cable (not shown).

Mounted on the male pin 14 and axially slidable thereon is a self-latching male wiper seal assembly shown generally at 16, and to be described in more detail below. In FIG. 1 the self-latching male wiper seal assembly 16 is in the decoupled position.

Figure 2:
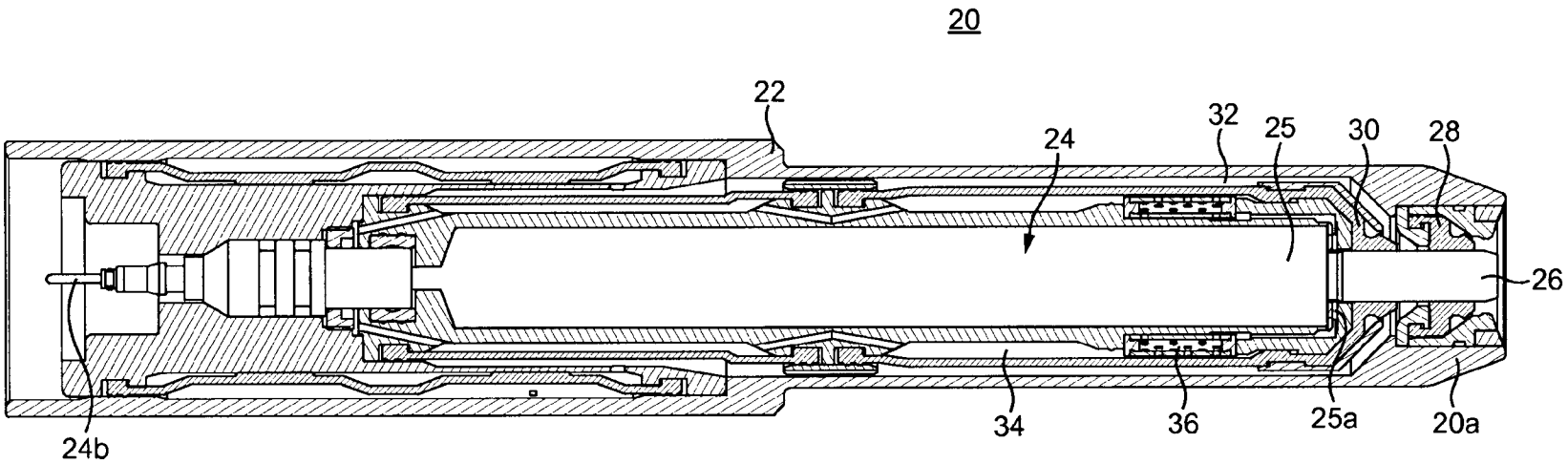
FIG. 2 is a part sectional view of a female component of a connector assembly for cooperation with the male component of FIG. 1, according to an embodiment of the invention.

FIG. 2 shows generally at 20 a female component of a connector assembly according to an embodiment of the invention. The component 20 comprises a substantially cylindrical hollow housing 22 inside which is located a female contact module 24 comprising an outer sleeve 25.

Located telescopically within the outer sleeve 25 of the contact module 24 is an axially slidable shuttle pin 26, which in the disengaged configuration depicted in FIG. 2, emerges from an open end 25a of the outer sleeve 25 of the contact module 24. At an opposed end 24b of the contact module 24 is a cable termination, to which an electrical cable (not shown) is permanently connected in use. A primary wiper seal 28 and an axially spaced secondary wiper seal 30 are located around the shuttle pin 26. The primary and secondary wiper seals 28, 30 are substantially annular and are axially fixed with respect to the housing 22.

The primary wiper seal 28 makes and maintains an intimate annular contact with the shuttle pin 26. The primary wiper seal 28 also retains a first dielectric fluid under pressure in a first dielectric fluid chamber 32.

The secondary seal 30 also makes and maintains an intimate annular contact with the shuttle pin 26. The secondary wiper seal 30 retains a second dielectric fluid within a second dielectric fluid chamber 34. Within the second dielectric fluid chamber 34 a water ingress treatment module 36, in the form of a molecular sieve, has the function of removing any droplets of water or other contaminant that may have been inadvertently introduced into the second dielectric fluid.

Within the contact module 24 is a substantially annular electric contact (not shown) arranged in use to make an electric contact with the contact band 14c of the male contact pin 14 of FIG. 1, when the male and female components 10 and 20 are in complete electrical and mechanical union. As will be described below, the electrical contact is made when the shuttle pin 26 becomes axially displaced by the male contact pin 14 of FIG. 1.

FIGS. 3a-3h show schematically in stages the mechanical and eventual electrical engagement between the male component 10 and female component 20, described above in relation to FIGS. 1 and 2. Reference numerals used in these figures remain the same throughout.

The component 10, otherwise known as the "receptacle", despite physically receiving its counterpart 20, is conventionally described as the male component due to the presence within it of the male contact pin 14 which is arranged in use to penetrate the component 20. Likewise, although the component 20, often referred to as a "plug", is arranged to enter the component 10, it is conventionally referred to as the female component because the contact module 24 within it is arranged in use to be penetrated by the male contact pin 14.

Figure 3A:
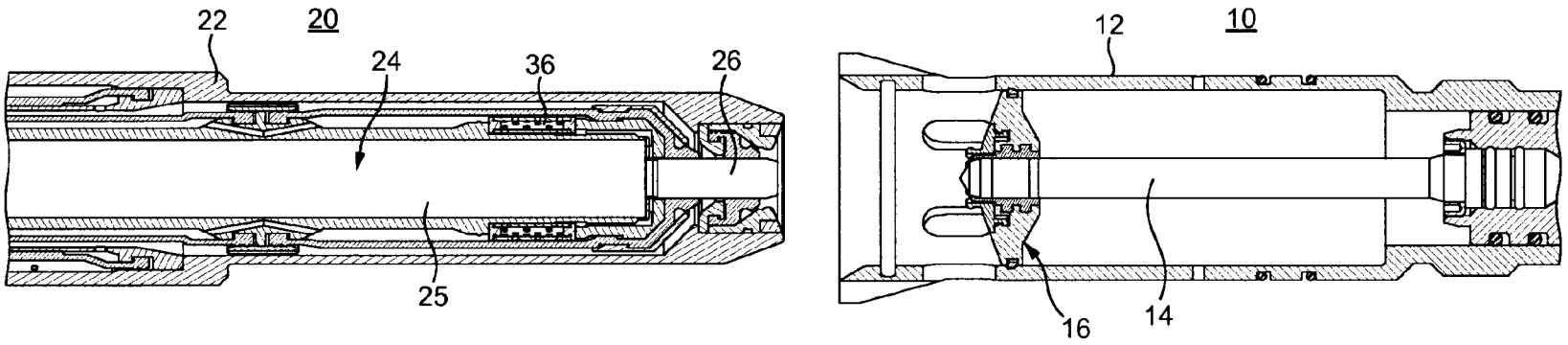
FIGS. 3a-3h show schematically the male component of FIG. 1 and female component of FIG. 2 at various stages during mechanical and electrical engagement.

FIG. 3a shows the male 10 and female 20 components spaced apart, but axially aligned and ready for engagement.

Figure 3B:
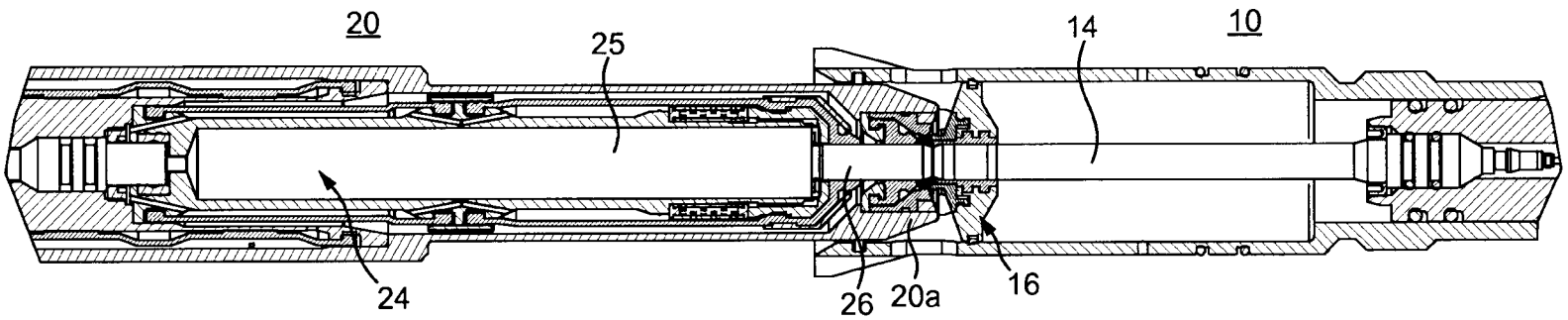

In FIG. 3b a plug nose portion 20a of the female component 20 comes into contact with the front of the wiper seal assembly 16 of the male component 10.

Figure 3C:
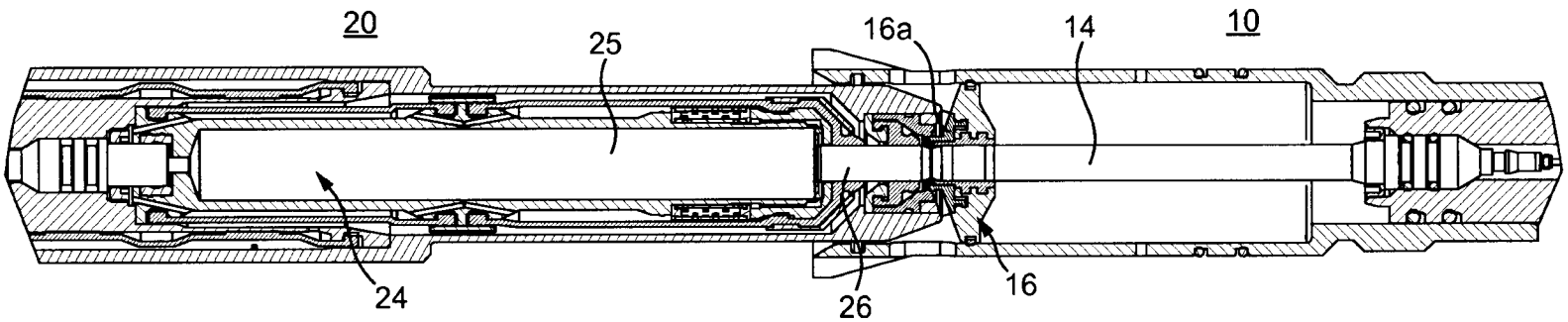

FIG. 3c shows the male contact 14 of the male component 10 coming into contact with the axially slidable shuttle pin 26 of the female component 20. In addition, a latch portion 16a of the self-latching male wiper seal assembly 16, described in more detail below, begins to latch with a corresponding profile of the plug nose portion 20a of the female component 20.

Figure 3D:
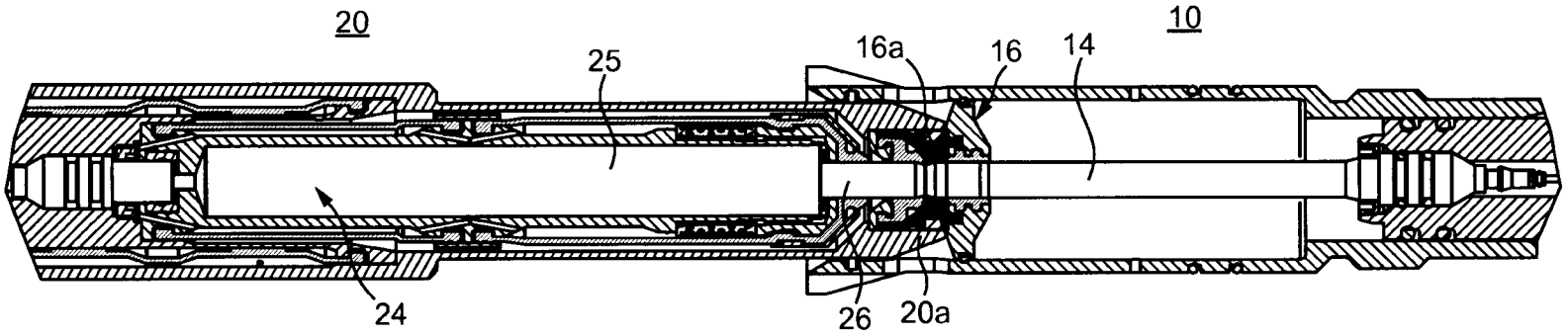

In FIG. 3d, the latch portion 16a is fully engaged with the plug nose portion 20a of the female component 20. The male contact pin 14 has begun to push back the shuttle pin 26 into the contact module 24 of the female component 20.

Figure 3E:
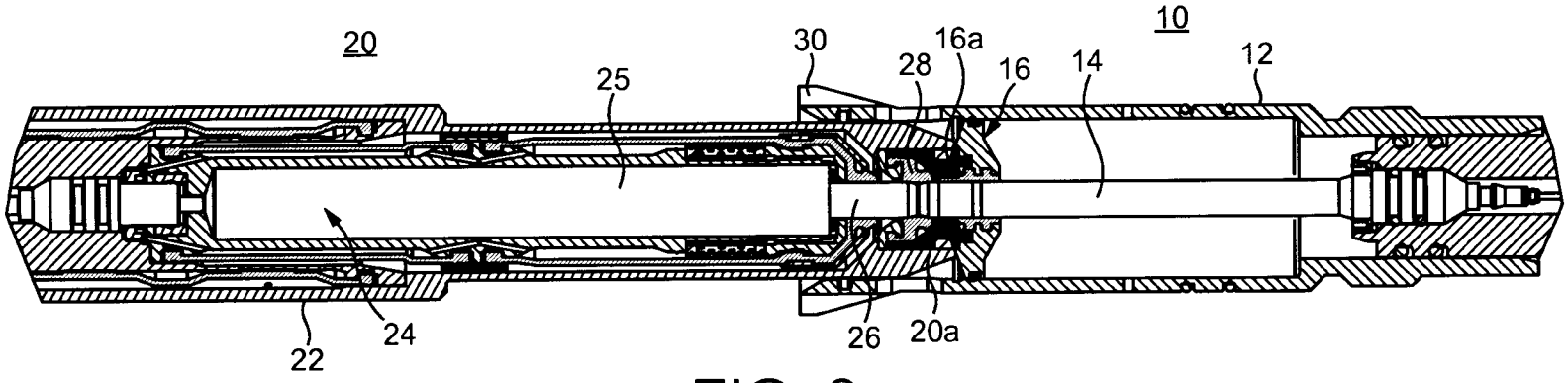
Figure 3F:
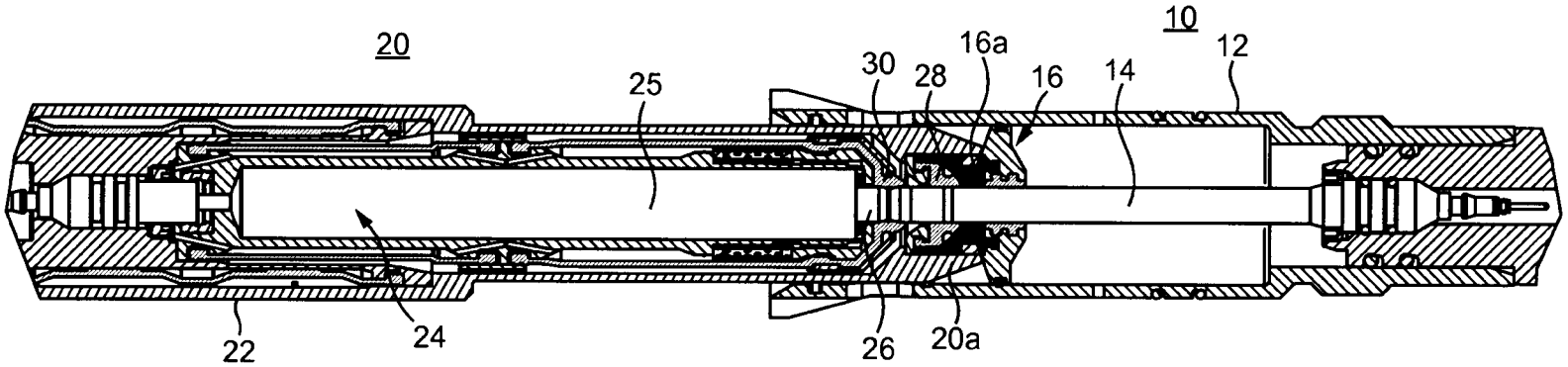

FIG. 3e shows the male component pin 14 has now pushed through the primary wiper seal 28 of the female component, driving the shuttle pin 26 further into the contact module 24. A continuous seal is maintained by the primary wiper seal 28 between the shuttle pin 26 and the male contact pin 14. In the male component 10 the self-latching male wiper seal assembly 16 has begun to be pushed back further into the housing 12 by the front portion 20a of the female plug component, as it does so sliding axially on the male contact pin 14. In FIG. 3f the male contact pin 14 is shown passing through the second wiper seal 30.

Figure 3G:
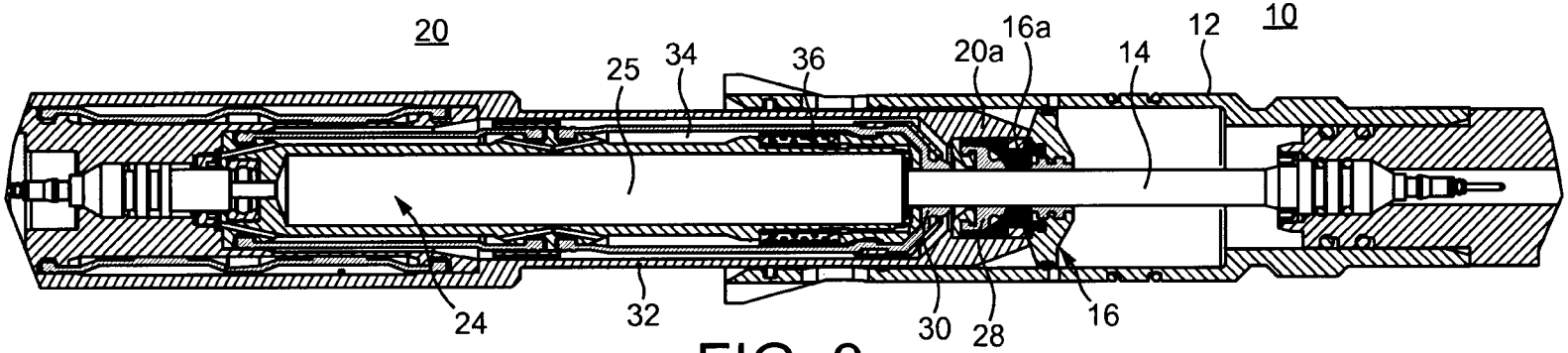
Figure 3H:
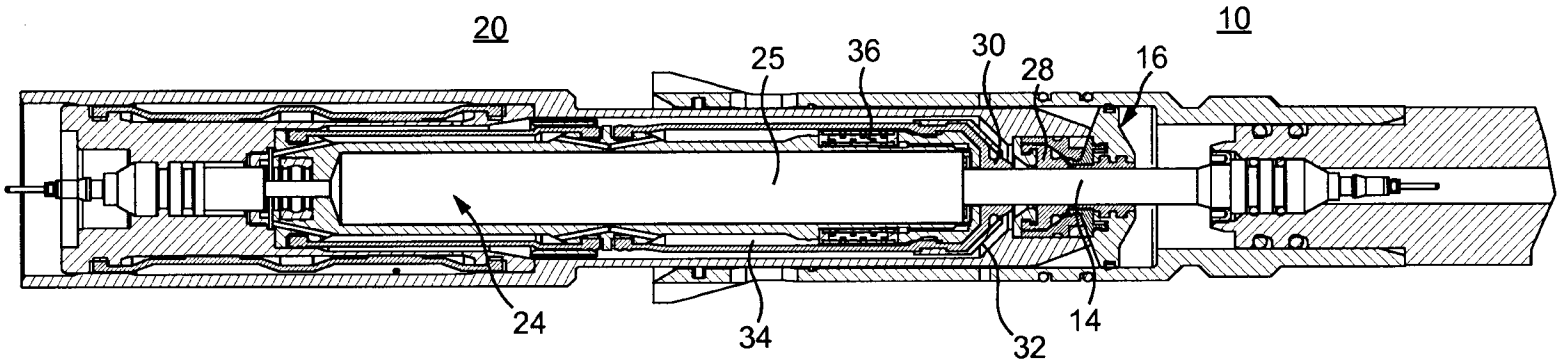

FIGS. 3g and 3h show the arrangements of the male and female connector components 10 and 20 in the final stages of electrical and mechanical engagement. Inside the contact module 24 the male contact pin 14 makes an electrical connection with its counterpart female contact (not shown). The rearward movement of the shuttle pin 26 causes dielectric oil in the second dielectric fluid chamber 34 to flow through the water ingress treatment module 36, which removes any traces of water in the dielectric fluid so as to maintain the electrical performance of the dielectric fluid. The self-latchinq male wiper seal assembly 16 has moved axially over the male contact pin 14 rearwards into the housing 12 and is in the coupled position.

FIGS. 4a-4e show schematically a more detailed part sectional view of the engagement of the male 10, and female 20, components.

Figure 4A:
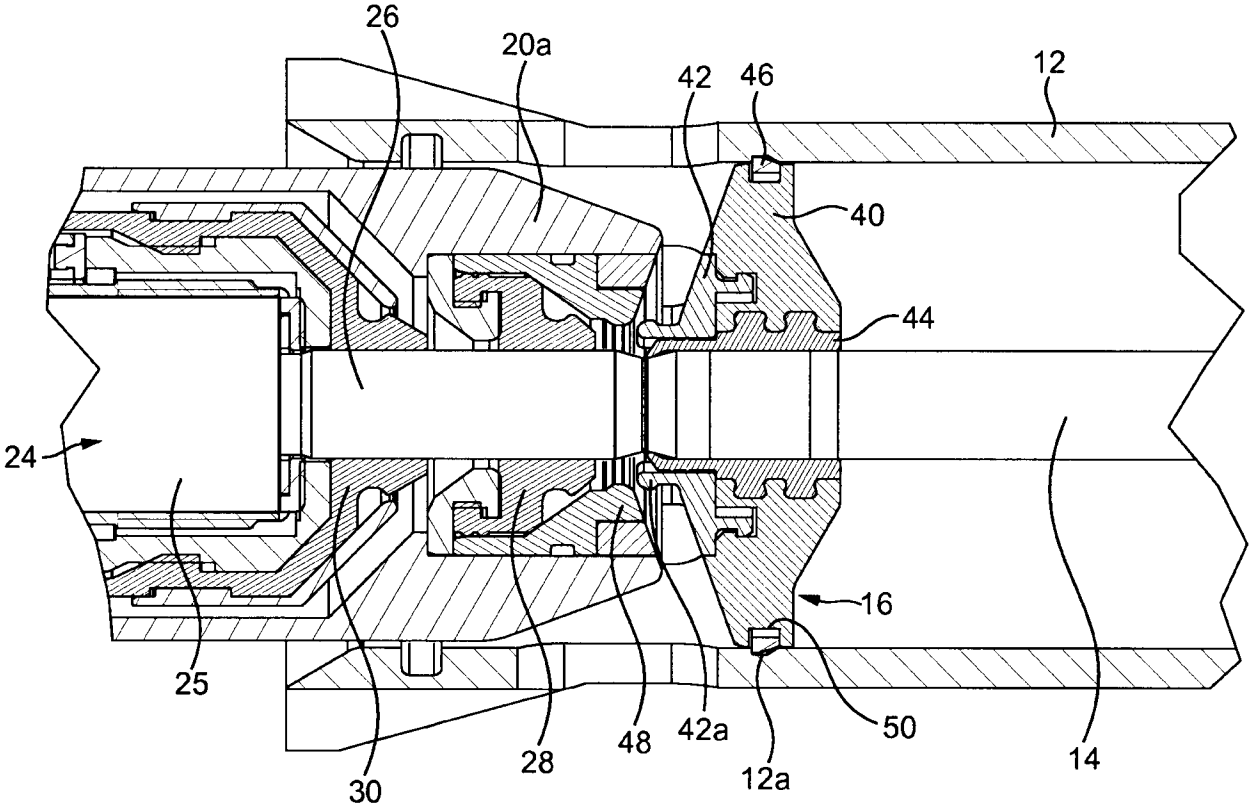
FIGS. 4a-4e show schematically in more detail some of the stages depicted in FIGS. 3a-3h.

FIG. 4a shows the male 10 and female 20 components at initial contact. The self-latching male wiper seal assembly 16 is substantially annular and surrounds the male contact pin 14. In FIG. 4a the self-latching wiper seal assembly 16 is shown in the normal resting decoupled position. The self-latching male wiper seal assembly 16 comprises a cap body 40, a resilient cantilever latch plate 42, a solid protective rubber sleeve 44 and a resilient slotted retaining (latching) ring 46. In the decoupled position the retaining ring 46 is engaged, or located, in an annular groove 12a formed on an inner surface of the housing 12 which retains the self-latching male wiper seal assembly 16 in the decoupled position when the male and female components 10, 20 are decoupled. The nose part 20a of the female plug component 20 comprises an annular sleeve 48 having a female profile which is an annular recess arranged to receive and latch with a corresponding male profile 42a which is an annular projection at the tip of the cantilever plate 42.

Figure 4B:
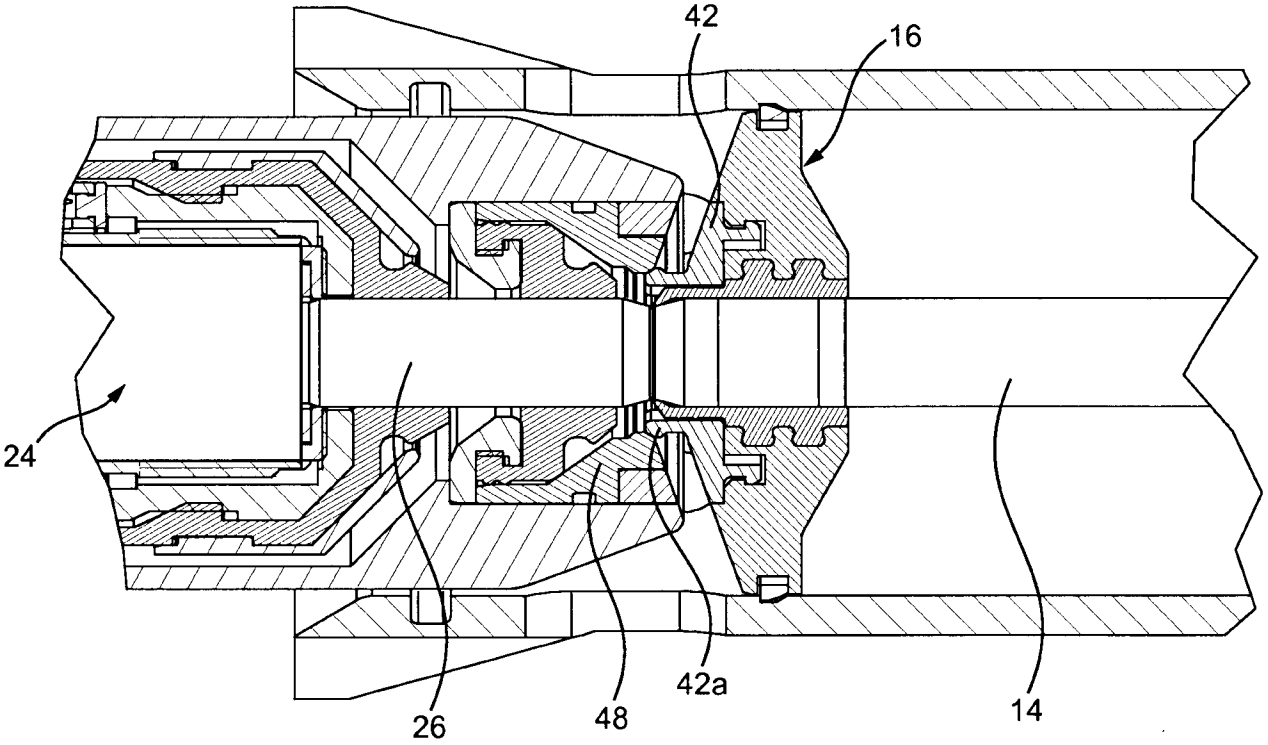

In FIG. 4b the first distal end 14a of the male contact pin 14 abuts the distal end of the shuttle pin 26 and the complementary latching profiles of the annular sleeve 48 and the male profile 42a start to fully engage with one another.

Figure 4C:
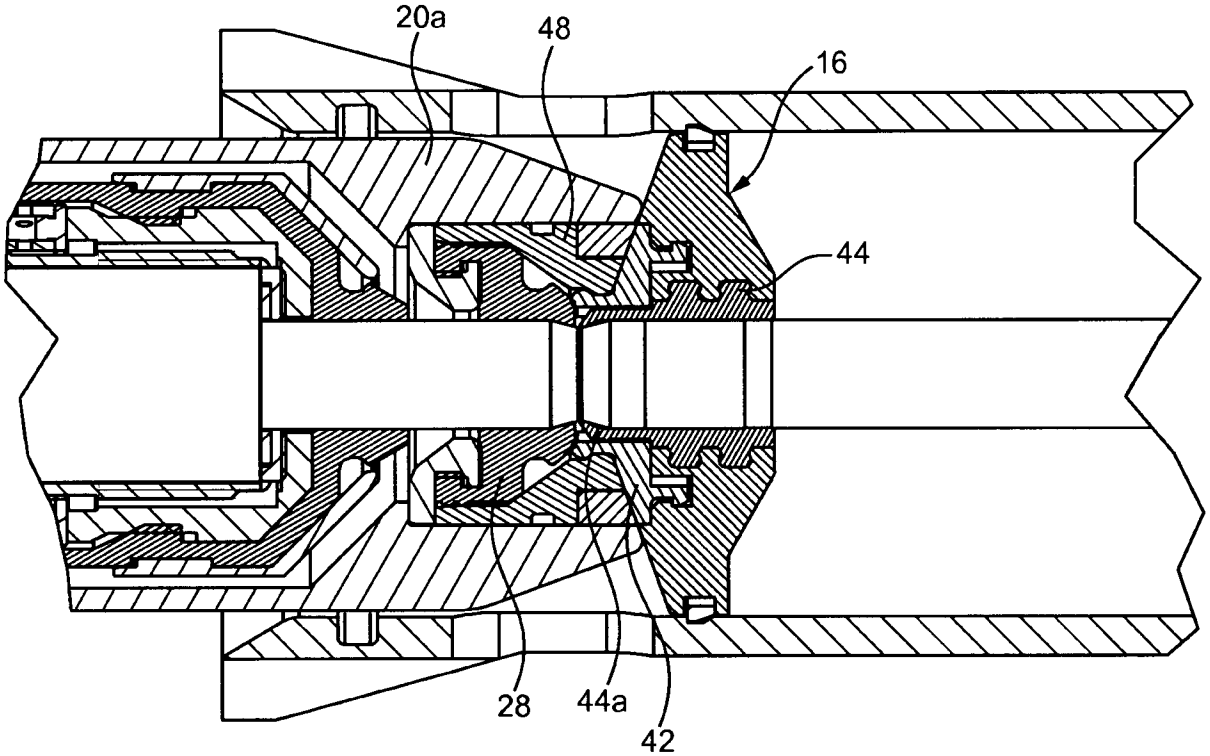

In FIG. 4c the latching is complete and the male profile of the resilient cantilever latch plate 42 is engaged with the female profile of the annular sleeve 48 of the female component 20. The self-latching male wiper seal assembly 16 of the male component 10 is secured, or latched, to the plug nose portion 20a of the female component 20 by the corresponding latching profiles. A lip 44a of the solid protective rubber sleeve 44 abuts the first wiper seal 28 of the female component to form a water-resistant barrier prior to the passing of the male contact pin 14 though the first wiper seal 28.

Figure 4D:
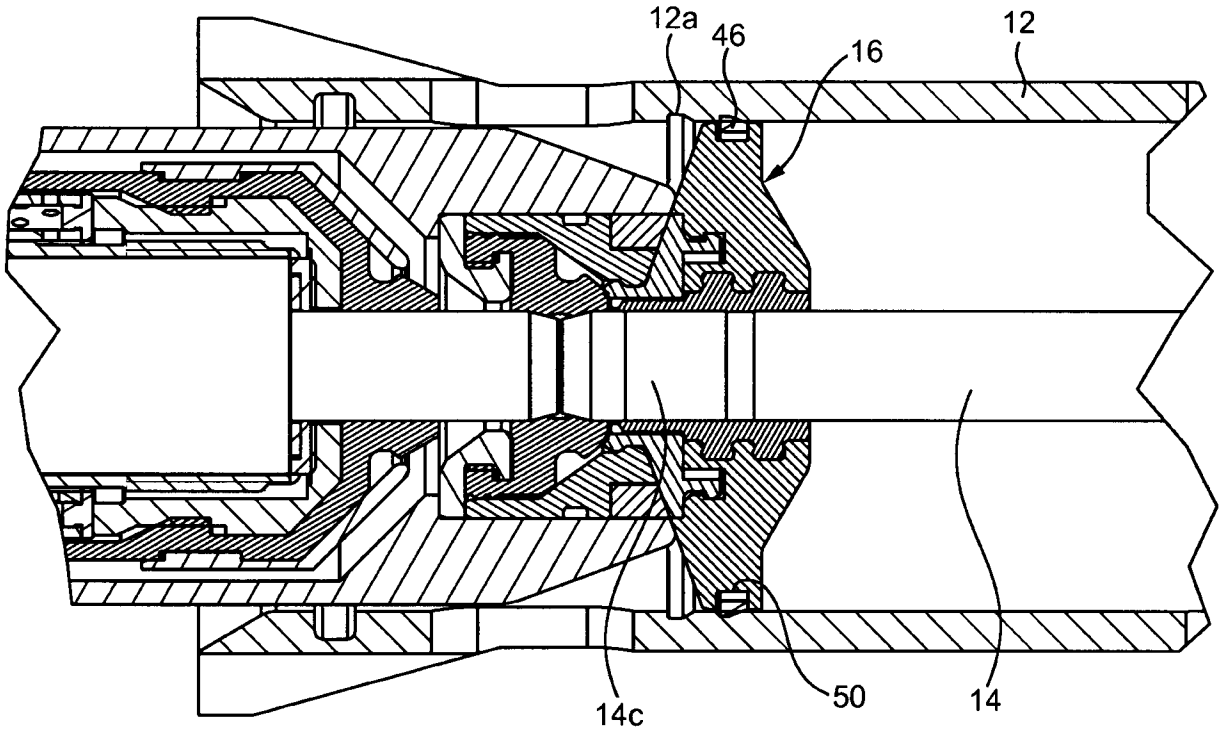

FIG. 4d shows the self-latching male wiper seal assembly 16 of the male component 10 passing further into the housing 12 of the male component as its slides axially over the male contact pin 14. The slotted retaining ring 46 has become compressed and is disengaged from the annular groove 12a. The retaining ring 46 axially moves with the self-latching male wiper seal assembly 16 since it is constrained within an annular groove 50 around the self-latching male wiper seal assembly 16 inside the bore of the housing 12.

Importantly, in this particular embodiment, the coupling force required to disengage the retaining ring 46 from the annular groove 12a is greater than the force required to engage the latch between the annular sleeve 48 of the female component 20 and the self-latching male wiper seal assembly 16. This ensures that upon coupling of the male and female components, the self-latching male wiper seal assembly 16 is latched to the female component 20 before the retaining ring 46 is disengaged.

Figure 4E:
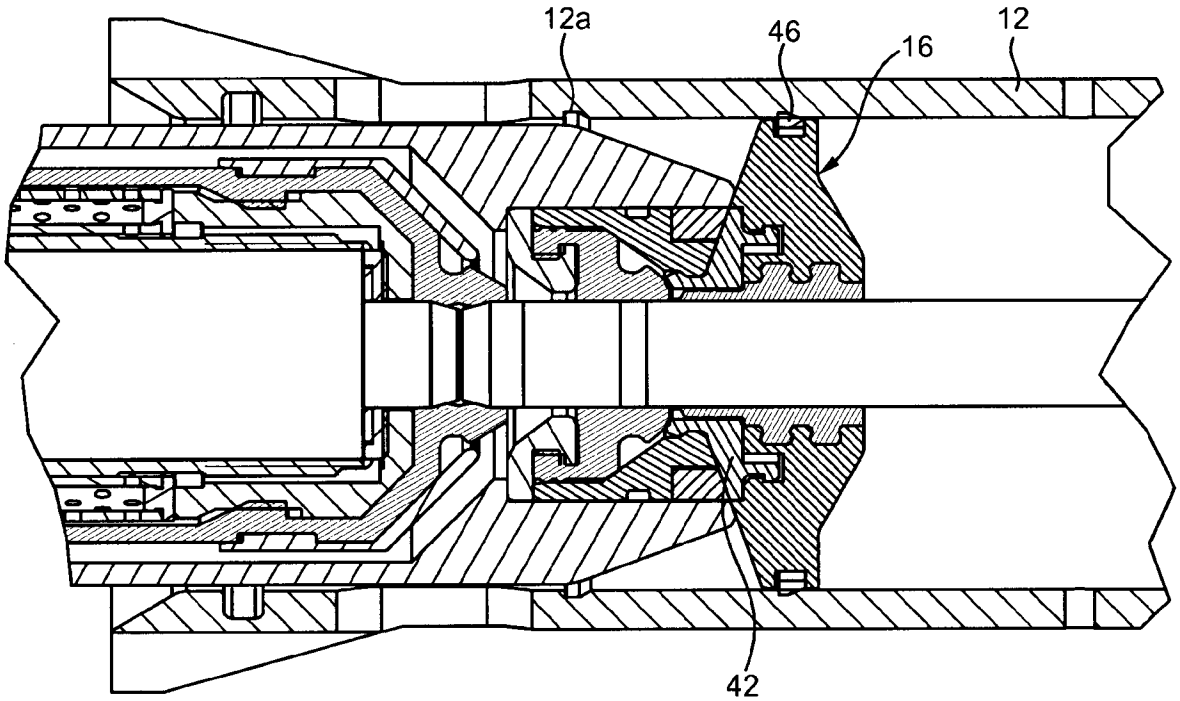

FIG. 4e shows that when disengaging the male 10 and female 20 components, the self-latching male wiper seal assembly 16 of the male contact pin 14 is drawn out and axially forwards from the coupled position by its latched engagement with the plug nose portion 20a of the female component 20, such that it returns towards its non-engaged, or decoupled, position. The latching engagement between the female profile of the annular sleeve 48 (on the female component 20) and the self-latching male wiper assembly 16 becomes finally disengaged when the resilient slotted retaining ring 46 reaches the annular groove 12a in the bore of the housing 12, which prevents further withdrawal of the latching wiper assembly 16, resulting in the temporary resilient deformation of the cantilever plate 42.

A key advantage provided by the self-latching facility of the self-latching male wiper assembly 16 is that the wiper assembly returns to its starting position when the male and female components become disengaged, and it does so without the need for any biasing means such as springs, which take up much-needed space and may be prone to failure.

Although it is described that the self-latchinq male wiper seal assembly 16 comprises a male latching portion that is arranged to latch with a female latching portion provided on the female component, it will be appreciated by one skilled in the art that the male latching portion may be provided on the female component and the female latching portion may be provided on the male wiper seal assembly. Furthermore, it is not essential that the corresponding latching parts provided on the male wiper seal assembly and the female component comprise a resiliently deformable portion. In some embodiments the latching parts may be magnetic, for example.

As will be readily appreciated by one skilled in the art, although it has been described that the connector is an electrical connector, the connector could be an optical connector or a hydraulic connector or any combination thereof, for example.

The invention claimed is:

1. A wet-mateable connector for making a connection underwater comprising:

a male component having *a tubular male housing within which is disposed* a male pin [and]*;* a female component having a [tubular male housing within which is disposed;] a female socket for receiving the male pin;

wherein the tubular male housing is arranged to receive at least a portion of the female component when the male and female components are coupled;

wherein the male component has a male wiper seal assembly disposed in the tubular male housing and around the male pin, which moves between a decoupled and a coupled position during coupling of the male component and female component so as to wipe at least a portion of the male pin; and a latch arranged to latch the male wiper seal assembly to the female component during coupling such that when the male and female components are decoupled, the male wiper seal assembly is returned to the decoupled position*;*

*wherein the male component further comprises a retainer that when engaged retains the male wiper seal assembly in the decoupled position, thereby restricting the movement of the male wiper seal assembly;*

*wherein the retainer comprises a retaining member and a corresponding retaining recess, at least one of which is resiliently deformable; and*

*wherein the retaining member is substantially annular and is disposed in a substantially annular recess provided in the male wiper seal assembly or in the male component, and wherein the retaining recess is formed in the other of the male wiper seal assembly and the male component.*

2. The wet-mateable connector according to claim 1, wherein the latch comprises corresponding latch parts provided on the male wiper seal assembly and the female component that are arranged to engage with one another so as to latch the male wiper seal assembly to the female component.

3. The wet-mateable connector according to claim 2, wherein at least one of the corresponding latch parts is resiliently deformable.

4. The wet-mateable connector according to claim 3, wherein one of the latch parts is a cantilevered plate.

5. The wet-mateable connector according to claim 1, wherein the male wiper seal assembly is axially moveable.

6. The wet-mateable connector according to claim 1, wherein the female component comprises a female wiper seal disposed such that when the male wiper seal assembly is latched to the female component, the male and female wiper seals abut.

[7. The wet-mateable connector according to claim 1, wherein the male component further comprises a retainer that when engaged retains the male wiper seal assembly in the decoupled position, thereby restricting the movement of the male wiper seal assembly.]

8. The wet-mateable connector according to claim [7] *1*, wherein the retainer is arranged to be automatically disengaged during coupling of the male and female components, such that the male wiper seal assembly can move to the coupled position.

9. The wet-mateable connector according to claim [7] *1*, wherein the retainer is arranged to be disengaged by applying a coupling force to the male wiper seal assembly from the female component in a direction towards the coupled position.

10. The wet-mateable connector according to claim 9, wherein the coupling force required to disengage the retainer is greater than [the] *a* force required to engage the latch such that during coupling of the male and female components the latch engages before the retainer disengages.

11. The wet-mateable connector according to claim [7] *1*, wherein the retainer prevents the male wiper seal assembly from being withdrawn from the male component.

[12. The wet-mateable connector according to claim 7, wherein the retainer comprises a retaining member and a corresponding retaining recess, at least one of which is resiliently deformable.]

[13. The wet-mateable connector according to claim 12, wherein the retaining member is substantially annular and is disposed in a substantially annular recess provided in the male wiper seal assembly or in the male component, and wherein the retaining recess is formed in the other of the male wiper seal assembly and the male component.]

14. The wet-mateable connector according to claim [7] *1*, wherein the retainer, when engaged, acts between the male wiper seal assembly and the tubular male housing.

15. The wet-mateable connector according to claim 1, wherein the connector is an electrical connector and/or an optical connector.

16. The wet-mateable connector according to claim 1, wherein the male pin is disposed entirely within the tubular male housing.

17. The wet-mateable connector according to claim 1, wherein the tubular male housing is arranged to receive at least a portion of the female component during coupling.

18. A wet-mateable connector for making a connection underwater comprising:

a male component having a tubular male housing within which is disposed a male pin; and a female component having a female socket for receiving the male pin;

wherein the tubular male housing is arranged to receive at least a portion of the female component when the male and female components are coupled;

wherein the male component further comprises:

a male wiper seal assembly disposed in the tubular male housing and around the male pin, which is axially moveable and moves between a decoupled and a coupled position during coupling of the male component and female component so as to wipe at least a portion of the male pin; and a retainer that when engaged retains the male wiper seal assembly in the decoupled position, thereby restricting the movement of the male wiper seal assembly; and which is arranged to be automatically disengaged during coupling of the male and female components, such that the male wiper seal assembly can move to the coupled position; and wherein the connector further comprises: a latch comprising corresponding latch parts provided on the male wiper seal assembly and the female component that are arranged to engage with one another so as to latch the male wiper seal assembly to the female component during coupling, such that when the male and female components are decoupled, the male wiper seal assembly is returned to the decoupled position*;*

*wherein the retainer comprises a retaining member and a corresponding retaining recess, at least one of which is resiliently deformable; and*

*wherein the retaining member is substantially annular and is disposed in a substantially annular recess provided in the male wiper seal assembly or in the male component, and wherein the retaining recess is formed in the other of the male wiper seal assembly and the male component.*

19. The wet-mateable connector according to claim 18, wherein the retainer, when engaged, acts between the male wiper seal assembly and the tubular male housing.

20. The wet-mateable connector according to claim 18, wherein the male pin is disposed entirely within the tubular male housing.

21. The wet-mateable connector according to claim 18, wherein the tubular male housing is arranged to receive at least a portion of the female component during coupling.

* * * * *